(12) United States Patent
Hoffmann (10) Patent No.: US 12,009,171 B2
(45) Date of Patent: Jun. 11, 2024

(54) SWITCHING DEVICE

(71) Applicant: TDK Electronics AG, Munich (DE)

(72) Inventor: Robert Hoffmann, Berlin (DE)

(73) Assignee: TDK Electronics AG, Munich (DE)

( * ) Notice: Subject to any disclaimer, the term of this patent is extended or adjusted under 35 U.S.C. 154(b) by 71 days.

(21) Appl. No.: 17/052,752

(22) PCT Filed: May 6, 2019

(86) PCT No.: PCT/EP2019/061567
§ 371 (c)(1),
(2) Date: Nov. 3, 2020

(87) PCT Pub. No.: WO2019/215093
PCT Pub. Date: Nov. 14, 2019

(65) Prior Publication Data
US 2021/0166905 A1  Jun. 3, 2021

(30) Foreign Application Priority Data

May 7, 2018 (DE) .......................... 102018110919.9

(51) Int. Cl.
| H01H 9/30 | (2006.01) |
| H01H 50/20 | (2006.01) |
| H01H 50/34 | (2006.01) |
| H01H 50/36 | (2006.01) |

(52) U.S. Cl.
CPC ............ *H01H 50/34* (2013.01); *H01H 50/20* (2013.01); *H01H 50/36* (2013.01)

(58) Field of Classification Search
CPC ........ H01H 50/34; H01H 50/20; H01H 50/36; H01H 51/065; H01H 50/64; F16F 1/04

USPC .......................................................... 335/201
See application file for complete search history.

(56) References Cited

U.S. PATENT DOCUMENTS

| 210,027 | A |   | 11/1878 | Hansell |   |
|---|---|---|---|---|---|
| 3,323,086 | A |   | 5/1967 | Pimentel |   |
| 3,943,475 | A | * | 3/1976 | Fluder | H01H 51/10 335/169 |
| 4,755,781 | A | * | 7/1988 | Bogner | H01H 51/065 335/131 |
| 5,332,986 | A | * | 7/1994 | Wieloch | H01H 71/323 335/78 |
| 5,886,603 | A | * | 3/1999 | Powell | H01H 71/58 335/38 |

(Continued)

FOREIGN PATENT DOCUMENTS

| CN | 102543582 A | * | 7/2012 | ............. H01H 11/00 |
|---|---|---|---|---|
| CN | 205350164 U |   | 6/2016 |   |

(Continued)

*Primary Examiner* — Shawki S Ismail
*Assistant Examiner* — Lisa N Homza
(74) *Attorney, Agent, or Firm* — Slater Matsil, LLP (57) ABSTRACT

In an embodiment a switching device includes at least one stationary contact and a movable contact movable from a first switching state to a second switching state by a magnetic armature, wherein the magnetic armature has a spring configured to reset the movable contact from the second switching state to the first switching state, and wherein the spring has a first spring region with a first spring constant and a second spring region with a second spring constant which is greater than the first spring constant.

17 Claims, 5 Drawing Sheets

(56) References Cited

U.S. PATENT DOCUMENTS

| | | | | |
|---|---|---|---|---|
| 5,892,194 | A * | 4/1999 | Uotome | H01H 51/065 |
| | | | | 335/154 |
| 6,193,225 | B1 | 2/2001 | Watanabe | |
| 7,157,996 | B2 * | 1/2007 | Enomoto | H01H 50/02 |
| | | | | 335/126 |
| 7,760,055 | B2 * | 7/2010 | Adunka | H01H 1/0015 |
| | | | | 335/8 |
| 10,180,195 | B2 | 1/2019 | Jensen | |
| 2008/0036561 | A1 * | 2/2008 | Hartinger | H01H 3/001 |
| | | | | 335/156 |
| 2013/0214883 | A1 | 8/2013 | Yano et al. | |
| 2018/0364313 | A1 * | 12/2018 | Hoffmann | H01H 9/54 |
| 2020/0058458 | A1 * | 2/2020 | Hoffmann | H01H 11/0062 |
| 2020/0402732 | A1 * | 12/2020 | Hoffmann | H01H 50/023 |
| 2021/0012987 | A1 * | 1/2021 | Hoffmann | H01H 3/001 |
| 2021/0057178 | A1 * | 2/2021 | Hoffmann | H01H 50/20 |
| 2021/0151269 | A1 * | 5/2021 | Hoffmann | H01H 9/302 |
| 2021/0202197 | A1 * | 7/2021 | Werner | H01H 50/023 |
| 2022/0139655 | A1 * | 5/2022 | Hoffmann | H01H 1/2008 |
| | | | | 335/131 |

FOREIGN PATENT DOCUMENTS

| | | | | |
|---|---|---|---|---|
| DE | 1590688 | B1 | 3/1971 | |
| DE | 3537598 | A1 | 5/1987 | |
| DE | 69505818 | T2 | 4/1999 | |
| DE | 19948446 | A1 | 4/2001 | |
| DE | 69714895 | T2 | 12/2002 | |
| DE | 20320532 | U1 | 9/2004 | |
| DE | 112004000087 | T5 | 11/2005 | |
| DE | 102015121033 | A1 | 1/2017 | |
| DE | 202018101604 | U1 | 4/2018 | |
| DE | 202018101604 | U1 * | 5/2018 | |
| DE | 102018110920 | A1 * | 11/2019 | H01H 50/023 |
| GB | 206316 | A | 11/1923 | |

* cited by examiner

SWITCHING DEVICE

This patent application is a national phase filing under section 371 of PCT/EP2019/061567, filed May 6, 2019, which claims the priority of German patent application 102018110919.9, filed May 7, 2018, each of which is incorporated herein by reference in its entirety.

TECHNICAL FIELD

A switching device is described.

BACKGROUND

The switching device is embodied, in particular, as a remotely operated, electromagnetically acting switch which can be operated by electrically conductive current. The switching device can be activated via an electrical control circuit and can switch an electrical load circuit. In particular, the switching device can be designed as a relay or as a contactor, in particular as a power contactor. The switching device may particularly preferably be designed as a gas-filled power contactor.

A possible application for switching devices of this kind, in particular power contactors, is opening and isolating electrical battery circuits, for example in motor vehicles such as electrically or partially electrically driven motor vehicles. These may be, for example, purely battery-operated vehicles (BEV: "battery electric vehicle"), hybrid electric vehicles which can be charged via a power outlet or charging station (PHEV: "plug-in hybrid electric vehicle") and hybrid electric vehicles (HEV). In general here, both the positive and the negative contact of the battery are isolated using a power contactor. This disconnection is performed in normal operation for example when the vehicle is at a standstill and also in the event of a disturbance such as an accident or the like. The main task of the power contactor here is to switch the vehicle to a de-energized state and to interrupt the flow of current.

A core feature of contactors of this kind is the ability to quickly and reliably remove the applied load in any installation position, that is to say even in the case of overhead installation when Earth's force of gravity does not act in the opening direction. In addition, quick opening of the contacts is desirable in order to not further promote the formation of switching arcs.

Resetting springs are used in order to effect the resetting movement of a power contactor, which resetting springs are compressed during the attraction process, store force during operation and then use this force at the moment of disconnection to push the contacts apart again. Linear springs, that is to say springs of which the spring constant and the opposing force are linear over the entire spring travel, are usually used for this purpose. This has the disadvantage that a very large amount of energy is required from the beginning of the attraction process in order to activate the contactor and in order to actually overcome the opposing force of the restoring spring.

German Patent Application No. DE 10 2015 121 033 describes using two dependent springs as a resetting spring mechanism. This has the advantage that only a small opposing force in the form of a first, relatively soft spring is opposed to the moving system at the beginning of the switching process. After a specific travel, the first, relatively soft spring is blocked and a second, hard spring is compressed. The latter is now possible more easily since the moving system is already in motion and therefore the opposing force of the relatively hard spring can be overcome more easily. Nevertheless, the same opposing force can be stored for the disconnection process in the final state, even though less energy had to be applied for the connection process. However, additional individual components have to be used for this purpose, specifically including a separator and a stop for the first spring, in addition to the two springs.

SUMMARY

Embodiments provide a switching device, particularly preferably a switching device in which the described disadvantages can be reduced or even prevented.

According to an embodiment, a switching device has at least one stationary contact and at least one movable contact. The at least one stationary contact and the at least one movable contact are intended and designed to switch on and switch off an electrical load circuit which can be connected to the switching device. The movable contact can move in the switching device in a corresponding manner between a non-switched-through state and a switched-through state of the switching device in such a way that the movable contact is at a distance from the at least one stationary contact and is therefore DC-isolated in the non-switched-through state of the switching device and is in mechanical contact with the at least one stationary contact and is therefore electrically conductively connected to the at least one stationary contact in the switched-through state. The switching device particularly preferably has at least two stationary contacts which are arranged in the switching device in a manner isolated from one another and which in this way can be electrically conductively connected to one another or electrically isolated from one another by the movable contact depending on the state of the movable contact.

Here and below, the non-switched-through state is referred to as the first switching state and the switched-through state is referred to as the second switching state of the switching device. At least one intermediate state is passed through when the changeover is made from the first switching state to the second switching state. The same intermediate state can be passed through when a reverse changeover is made from the second switching state to the first switching state. It may also be possible for another intermediate state to be passed through.

According to a further embodiment, the switching device has a housing in which the movable contact and the at least one stationary contact or the at least two stationary contacts are arranged. The movable contact can be arranged, in particular, entirely in the housing. The fact that a stationary contact is arranged in the housing can mean, in particular, that at least the contact region of the stationary contact, which is in mechanical contact with the movable contact in the second switching state, that is to say in the switched-through state, is arranged within the housing. For connection of a supply line of an electrical circuit which is to be switched by the switching device, electrical contact can be made with a stationary contact, which is arranged in the housing, from the outside, that is to say from outside the housing. To this end, a stationary contact which is arranged in the housing can project out of the housing by way of a portion and have a connection facility for a supply line outside the housing.

According to a further embodiment, the contacts are arranged in a gas atmosphere in the housing. This can mean, in particular, that the movable contact is arranged entirely in the gas atmosphere in the housing, and that furthermore at least portions of the stationary contact or contacts, for example the contact region or regions of the stationary contact or contacts, are arranged in the gas atmosphere in the housing. The switching device can accordingly particularly preferably be a gas-filled switching device such as a gas-filled contactor.

According to a further embodiment, the contacts, that is the movable contact entirely and at least portions of the stationary contact or contacts, are arranged in a switching chamber within the housing, in which switching chamber the gas, that is to say at least a portion of the gas atmosphere, is located. The gas can preferably have an $H_2$ content of at least 50%. In addition to hydrogen, the gas can include an inert gas, particularly preferably $N_2$ and/or one or more noble gases.

According to a further embodiment, the movable contact can be moved by means of a magnetic armature. To this end, the magnetic armature can have, in particular, a shaft which, at one end, is connected to the movable contact in such a way that the movable contact can be moved by means of the shaft, that is to say, when the shaft moves, said movable contact is likewise moved by said shaft. The shaft can, in particular, project through an opening in the switching chamber into the switching chamber. The magnetic armature can be movable by a magnetic circuit. In particular, the magnetic circuit can have a yoke which has an opening through which the shaft of the magnetic armature projects. The shaft can preferably include stainless steel or consist of stainless steel. The yoke can preferably include pure iron or a low-doped iron alloy or consist of pure iron or a low-doped iron alloy.

In particular, the movable contact can be movable from the first switching state to the second switching state by means of the magnetic armature. In other words, the changeover from the first switching state to the second switching state can be affected by way of the magnetic armature being moved by a magnetic force which is created by the magnetic circuit.

The magnetic armature furthermore has a spring which is designed to store energy when the changeover is made from the first switching state to the second switching state, which energy can reset the movable contact from the second switching state to the first switching state. This can mean, in particular, that the magnetic armature and therefore the movable contact are moved back by the spring in the absence of the magnetic force which is created by the magnetic circuit. The spring can be compressed, in particular, by the movement of the magnetic armature from the first switching state to the second switching state, which movement is effected by the magnetic force which is created by the magnetic circuit.

According to a further embodiment, the spring has a first spring region with a first spring constant and a second spring region with a second spring constant which is greater than the first spring constant. Therefore, the spring has two regions which are distinguished by a different spring hardness and accordingly by a different response to an external force. Therefore, the spring can particularly preferably be designed as a non-linear spring. Owing to the relatively small first spring constant in comparison to the second spring constant, the first spring region is compressed to a greater extent than the second spring region at least at the start of the switching process which is affected by the magnetic circuit. In particular, the spring can be designed in such a way that the first spring region is compressed when a changeover is made from the first switching state to an intermediate state. The spring can particularly preferably be designed in such a way that only or at least substantially only the first spring region is compressed when the changeover is made from the first switching state to the intermediate state.

The intermediate state can preferably correspond to a state of the spring starting from which the first spring region is no longer compressed or at least no longer substantially compressed in the event of further compression of the spring. This can be achieved, for example, by way of the spring being designed in such a way that the spring windings in the first spring region are blocked starting from when the intermediate state is reached in the event of further compression of the spring. Accordingly, the spring can be designed in such a way that the first spring region is therefore blocked during a changeover from the intermediate state to the second switching state. For example, the first spring region can be fully compressed starting from the intermediate state, so that the windings of the first spring region bear against one another starting from when the intermediate state is reached.

The spring can furthermore be designed in such a way that the second spring region is compressed when a changeover is made from the intermediate state to the second switching state. In particular, only the second spring region can be compressed here. This can be the case particularly preferably when the first spring region is blocked starting from when the intermediate state is reached in the event of further compression of the spring, as described above. The first spring region then acts like a stop for the second spring region.

Therefore, owing to the different spring constants, the different spring regions preferably respond to an external force, which is caused by the switching movement of the magnetic armature and which compresses the spring, in succession. As a result, it may be possible firstly for a first force, which is determined by the first spring region, to have to be overcome and only later for a second force, which is determined by the second spring region, to have to be overcome when the magnetic armature is attracted, that is to say when the changeover is made from the first switching state to the second switching state. Since the first force is smaller than the second force, only a small opposing force therefore has to be overcome at the beginning of the switching process. A higher opposing force has to be overcome only when the magnetic armature is already in motion and the described intermediate state has been reached. However, at this time, it may advantageously be possible for the moving system, that is to say substantially the magnetic armature with the movable contact, to have already picked up enough speed in order to overcome this relatively high resistance.

If the magnetic force which is created by the magnetic circuit is switched off, a sufficiently high resetting force, which moves the moving system back in the direction of the first switching state again, can be created by the second spring region. Here, the expansion of the spring can run in reverse to the above-described compression. In particular, it may be possible for a lower attraction energy to be able to be achieved by the described spring given an identical or even a higher resetting force than when using conventional linear springs.

According to a further embodiment, the first spring region and the second spring region have different windings, that is to say for example windings of different degrees of closeness in particular. As a result, the different spring regions can be produced when the same material is used for the entire spring, for example conventional spring steel. Here, it may be possible, depending on the desired spring constants and spring travels, for the first spring region and the second spring region to have a different number of windings, for example. Furthermore, it may also be possible for the first spring region and the second spring region to have the same number of windings. Furthermore, the first spring region and the second spring region can have different spring travels. As an alternative to this, identical spring travels are also possible.

The changeover from the first spring region to the second spring region can be abrupt. This can mean that the spring has a constant first winding spacing in the first spring region and a constant second winding spacing, which is different from the first winding spacing, in the second spring region, and the two spring regions directly adjoin one another. As an alternative to this, it may also be possible for the changeover from the first spring region to the second spring region to be continuous. Here, the spring can have a constant first winding spacing in the first spring region and a constant second winding spacing, which is different from the first winding spacing, in the second spring region, wherein there is a transition region between the first spring region and the second spring region, in which transition region the winding spacing changes from the first to the second winding spacing over several windings.

Furthermore, it may also be possible for the spring to have at least one third spring region with a third spring constant which is greater than the second spring constant. In respect of the design and the behavior of the third spring region in relation to the second spring region, that which is described above for the first spring region and the second spring region can apply. The second spring region can be arranged, for example, between the first spring region and the third spring region. Furthermore, it may also be possible for the first spring region to be arranged between the second spring region and the third spring region. Furthermore, there may also be more than three spring regions with different spring constants.

BRIEF DESCRIPTION OF THE DRAWINGS

Further advantages, advantageous embodiments and developments can be found in the exemplary embodiments described below in conjunction with the figures, in which.

DETAILED DESCRIPTION OF ILLUSTRATIVE EMBODIMENTS

In the exemplary embodiments and figures, identical, similar or identically functioning elements may each be provided with the same reference signs. The elements illustrated and their proportions with respect to each other should not be considered to be true to scale, instead individual elements such as, for example, layers, parts, components and regions may be illustrated to be disproportionately large for the purposes of improved presentability and/or for the purposes of better understanding.

Figure 1A:
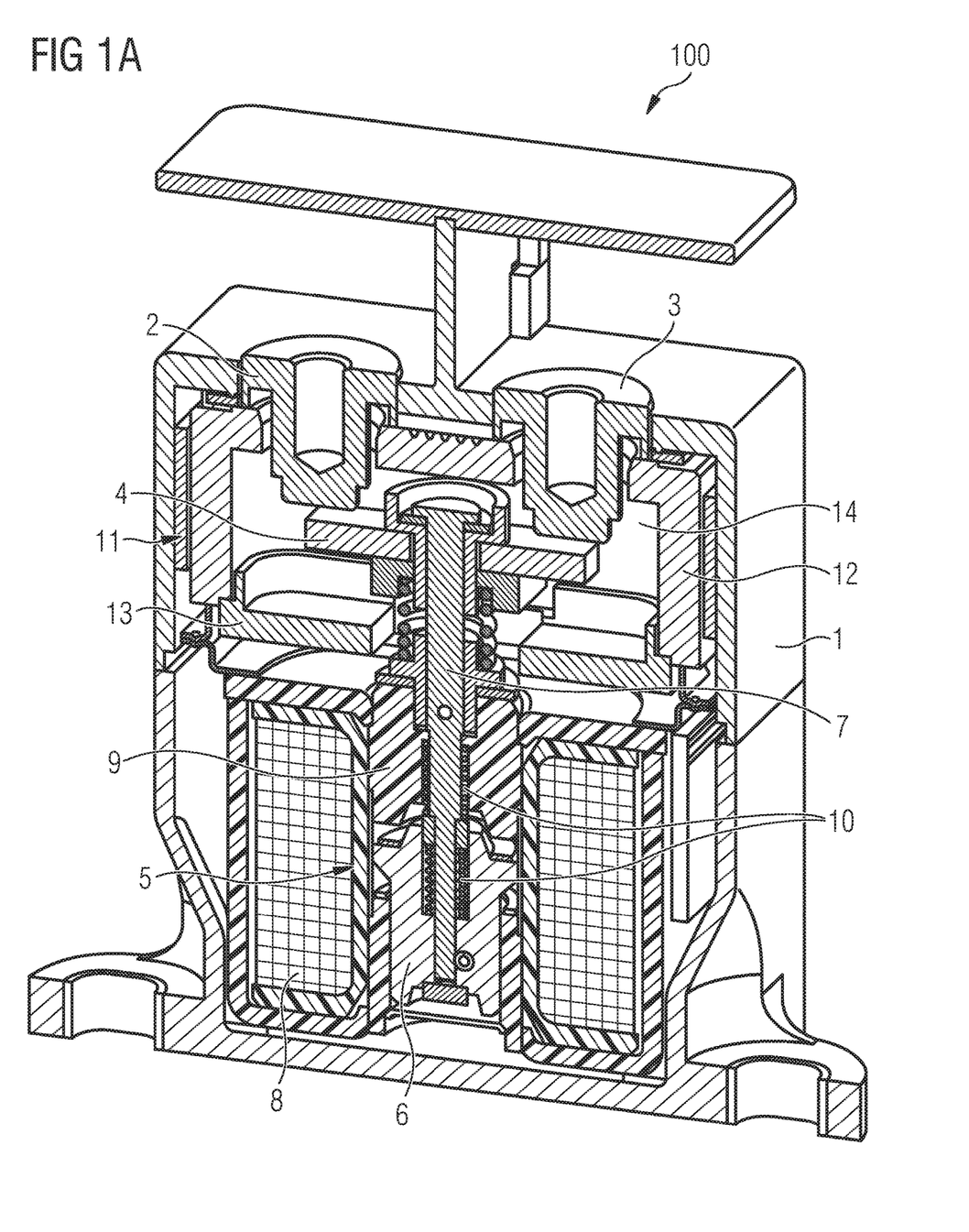
FIGS. 1A and 1B show schematic illustrations of an example of a switching device.
Figure 1B:
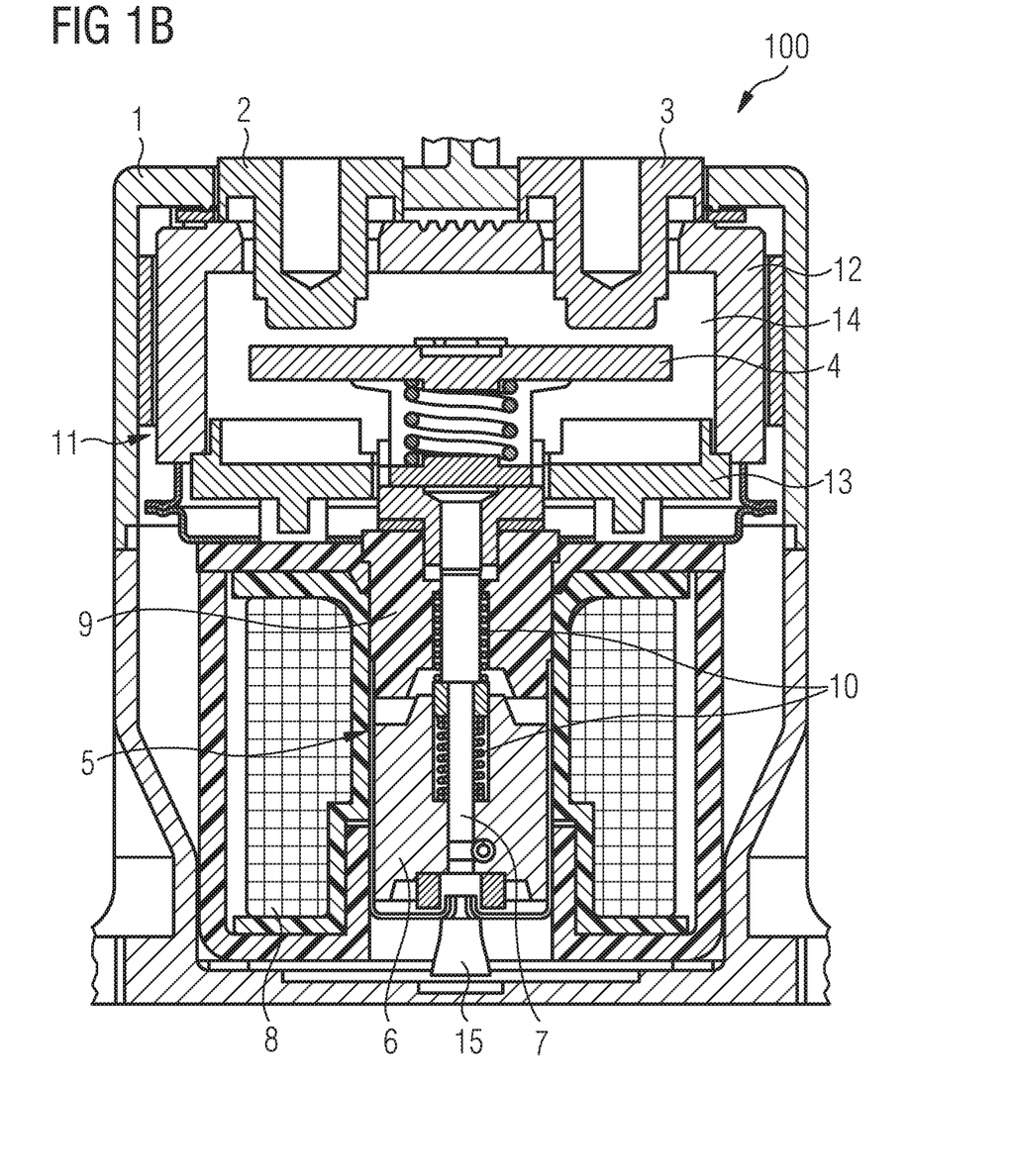

FIGS. 1A and 1B show an example of a switching device 100 which can be used, for example, for switching high electric currents and/or high electric voltages and which can be a relay or a contactor, in particular a power contactor. FIG. 1A shows a three-dimensional sectional illustration, while a two-dimensional sectional illustration is illustrated in FIG. 1B. The description which follows relates equally to FIGS. 1A and 1B. The geometries shown are to be understood merely by way of example and in a non-limiting manner, and can also be designed in an alternative manner.

The switching device 100 has two stationary contacts 2, 3 and a movable contact 4 in a housing 1. The movable contact 4 is designed as a contact plate. The stationary contacts 2, 3 together with the movable contact 4 form the switching contacts. The housing 1 serves primarily as protection against contact with the components which are arranged in the interior and includes or consists of a plastic, for example polybutylene terephthalate (PBT) or glass-filled PBT. The contacts 2, 3, 4 can, for example, contain or consist of copper, a copper alloy or a mixture of copper with at least one further metal, for example tungsten, nickel and/or chromium.

FIGS. 1A and 1B show the switching device wo in a first switching state, which corresponds to an inoperative state, in which the movable contact 4 is spaced apart from the stationary contacts 2, 3, so that the contacts 2, 3, 4 are DC-isolated from one another. The design shown for the switching contacts and in particular the geometry thereof are to be understood purely by way of example and in a non-limiting manner. As an alternative, the switching contacts can also be designed differently. For example, it may be possible for just one of the switching contacts to be designed to be stationary.

The switching device wo has a movable magnetic armature 5 which substantially performs the switching movement. The magnetic armature 5 has a magnetic core 6, for example comprising or consisting of a ferromagnetic material. Furthermore, the magnetic armature 5 has a shaft 7 which is guided through the magnetic core 6 and, at one shaft end, is fixedly connected to the magnetic core 6. At the other shaft end which is situated opposite the magnetic core 6, the magnetic armature 5 has the movable contact 4 which is likewise connected to the shaft 7. The shaft 7 can preferably be manufactured with or from stainless steel.

The magnetic core 6 is surrounded by a coil 8. A current flow, which can be introduced from outside, in the coil 8 generates, by way of a magnetic force, a movement of the magnetic core 6 and therefore of the entire magnetic armature 5 in an axial direction until the movable contact 4 makes contact with the stationary contacts 2, 3. The magnetic armature 5 therefore moves from the position in the first switching state, which corresponds to the inoperative state, that is to say to the isolating, that is to say non-switched-through, state, to a second position in a second switching state of the switching device 100 which corresponds to the active, that is to say switched-through, state. In the second switching state, that is to say in the active state, the contacts 2, 3, 4 are electrically conductively connected to one another. In another embodiment, the magnetic armature 5 can alternatively also execute a rotary movement. The magnetic armature 5 can be designed, in particular, as a tie rod or as a hinged armature. In order to guide the shaft 7 and therefore the magnetic armature 5, the switching device 100 has a yoke 9 which includes pure iron or a low-doped iron alloy or consists of pure iron or a low-doped iron alloy and which forms part of the magnetic circuit. The yoke 9 has an opening in which the shaft 7 is guided. If the current flow in the coil 8 is interrupted, the magnetic armature 5 in the example shown is moved back to the first position by one or more springs 10. The switching device 100 is then back in the inoperative state in which the contacts 2, 3, 4 are open.

When the contacts 2, 3, 4 are opened, an arc may be formed which can damage the contact areas. As a result, there may be the risk of the contacts 2, 3, 4 remaining "stuck" to one another owing to welding caused by the arc and no longer being separated from one another. In order to prevent the formation of arcs of this kind or at least to assist in the quenching of arcs which occur, the contacts 2, 3, 4 are arranged in a gas atmosphere, so that the switching device 100 is designed as a gas-filled relay or gas-filled contactor. To this end, the contacts 2, 3, 4 are arranged within a switching chamber 11, formed by a switching chamber wall 12 and a switching chamber base 13, in a hermetically sealed portion of the housing 1. The housing 1 and, in particular, the hermetically sealed portion of the housing 1 completely surround the magnetic armature 5 and the contacts 2, 3, 4. The hermetically sealed portion of the housing 1 and therefore also the switching chamber 11 are filled with a gas 14. The gas 14, which can be introduced via a gas-filling port 15 within the scope of the production of the switching device 100, can particularly preferably contain hydrogen, for example 50% or more $H_2$ in an inert gas or even 100% $H_2$ since hydrogen-containing gas can promote quenching of arcs. Furthermore, there may be so-called blowout magnets (not shown) within or outside the switching chamber 11, that is to say permanent magnets which can extend the arc path and therefore improve quenching of the arcs. The switching chamber wall 12 and the switching chamber base 13 can be manufactured, for example, with or from a metal oxide, such as $Al_2O_3$.

FIGS. 1A and 1B show a conventional spring arrangement comprising two springs 10 which effect the resetting of the switching device 100 from the second switching state to the first switching state when the magnetic field is switched off. However, additional components are required in comparison to using just one spring.

Figure 2:
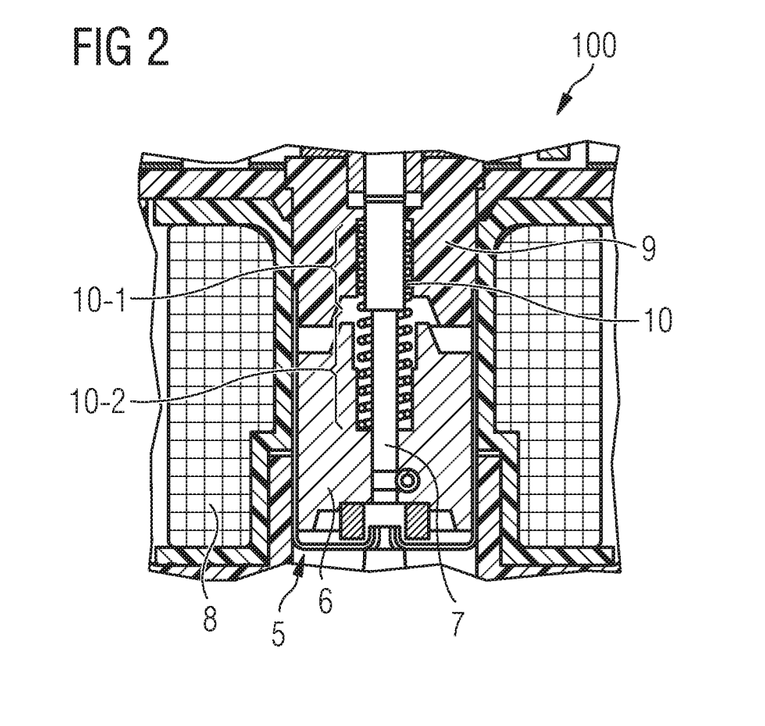
FIG. 2 shows a schematic illustrations of a portion of a switching device according to an exemplary embodiment.

FIG. 2 shows a detail of a switching device 100 according to an exemplary embodiment. Components and features of the switching device which are not shown and/or described in conjunction with FIG. 2 can be designed as described in conjunction with FIGS. 1A and 1B.

In comparison to the switching device 100 of FIGS. 1A and 1B, the switching device 100 shown in FIG. 2 has a spring 10 which has a first spring region 10-1 with a first spring constant and a second spring region 10-2 with a second spring constant. The spring constants of the spring regions 10-1 and 10-2 are different. Purely by way of example, the second spring constant is greater than the first spring constant, so that, in simple terms, the first spring region 10-1 is softer than the second spring region 10-2. Therefore, the spring 10 is a non-linear spring. The magnetic core 6 and the yoke 9 each form a stop for the spring 10 which is installed freely, but also under tension in the first switching state. For example, the spring 10 can be composed of spring steel, for example stainless steel type 1.4305 and, in a relaxed state, have a length in a range of greater than or equal to 7 mm and less than or equal to 20 mm, for example approximately 9 mm, and a diameter in the region of approximately 4 mm. The diameter of the spring 10 also depends on the diameter of the shaft 7 which projects through the windings of the spring 10 as shown. The manner of operation of the spring 10 is described in conjunction with FIGS. 3A to 3C.

Figure 3A:
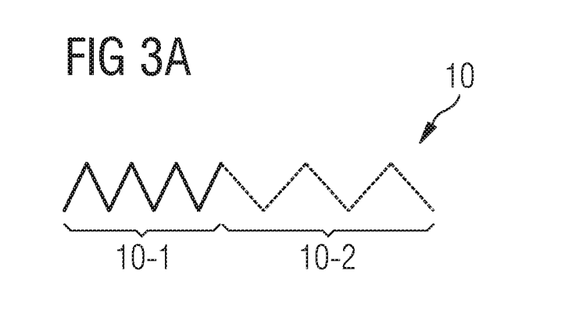
FIGS. 3A to 3C show schematic illustrations of different states of a spring of a switching device according to a further exemplary embodiment.
Figure 3B:
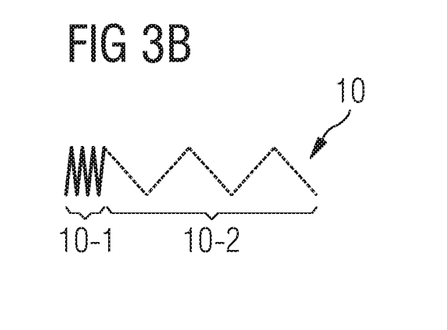
Figure 3C:
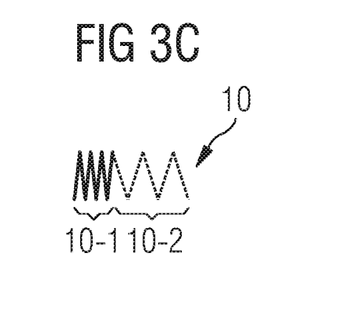

Various states of the spring 10 as occur during the switching processes of the switching device 100 are shown in conjunction with FIGS. 3A to 3C. The windings of the spring regions 10-1, 10-2 are indicated as zigzag lines here, and the different spring constants are indicated by the different types of line. The indicated number of windings of the spring regions 10-1, 10-2 is to be understood as being purely exemplary. In the exemplary embodiment shown, the spring constant of the first spring region 10-1 is smaller than the spring constant of the second spring region 10-2.

The spring 10 is compressed during the switching process which is effected by the magnetic circuit, that is to say when the changeover is made from the first switching state, the open state, to the second switching state, the closed state, and can therefore store energy which can reset the movable contact from the second switching state to the first switching state when the force which is created by the magnetic circuit is switched off.

FIG. 3A shows the spring 10 in the first switching state in which the spring 10 is held under tension between the stops which are formed by the magnetic core and the yoke. If a switching current is applied to the coil of the magnetic circuit, the magnetic armature moves in the direction of the stationary contacts, so that the spring 10 is compressed. Since the spring constant of the first spring region 10-1 is smaller than that of the second spring region 102, substantially and particularly preferably only the first spring region 10-1 is initially compressed. This takes place until the first spring region 10-1 is compressed to such an extent that the spring windings of the first spring region 10-1 are blocked in the course of further compression of the spring 10 starting from when an intermediate state is reached. This intermediate state is shown in FIG. 3B in which the first spring region 10-1 is substantially or particularly preferably completely compressed and therefore blocked. During the further course of compression of the spring 10, substantially and particularly preferably only the second spring region 10-2 is compressed starting from when the intermediate state is reached until when the second switching state is reached. Since the moving system, that is to say substantially the magnetic armature with the movable contact, has already picked up enough speed when passing through the intermediate state, it is readily possible to overcome the resistance of the second spring region 10-2, which resistance is higher than in the first spring region 10-1. FIG. 3C shows the spring 10 in the second switching state in which the second spring region 10-2 is also compressed. Said second spring region can be completely or only partially compressed, depending on the design of the spring 10 and in particular of the spring travel of the second spring region 10-2.

If the magnetic force which is created by the magnetic circuit is switched off, a sufficiently high resetting force, which moves the moving system back in the direction of the first switching state again, can be created at least by the second spring region 10-2. In particular, the expansion of the spring 10 can run in reverse to the described compression during the course of the return to the first switching state.

By way of selecting the spring material and the number and pitch of the windings of the first spring region 10-1 and the second spring region 10-2, it is possible to set the spring constants and spring travels of the spring regions 10-1, 10-2 in a desired manner in order to be able to optimally effect the two switching directions. The first spring region 10-1 and the second spring region 10-2 particularly preferably have different windings, that is to say for example in particular windings of different degrees of closeness or different winding pitches. As a result, the different spring constants can be affected when the same material is used for the entire spring. Depending on the desired spring constants and spring travels, it may be possible here for the first spring region 10-1 and the second spring region 10-2 to have, for example, different numbers of windings. Furthermore, it may also be possible for the first spring region 10-1 and the second spring region 10-2 to have the same number of windings. Furthermore, the first spring region 10-1 and the second spring region 10-2 can have different spring travels. As an alternative to this, identical spring travels are also possible.

The changeover from the first spring region 10-1 to the second spring region 10-2 can be abrupt, as shown in FIGS. 3A to 3C. Here, the spring 10 can have a constant first winding spacing in the first spring region 10-1 and a constant second winding spacing, which is different from the first winding spacing, in the second spring region 10-2, wherein the two spring regions 10-1, 10-2 directly adjoin one another, so that the changeover from the first spring region 10-1 to the second spring region 10-2 is abrupt. As an alternative to this, it may also be possible for the changeover from the first spring region 10-1 to the second spring region 10-2 to be continuous, that is to say that there is a transition region between the first spring region 10-1 and the second spring region 10-2, in which transition region the winding spacing changes from the first winding spacing to the second winding spacing over several windings.

Figure 4A:
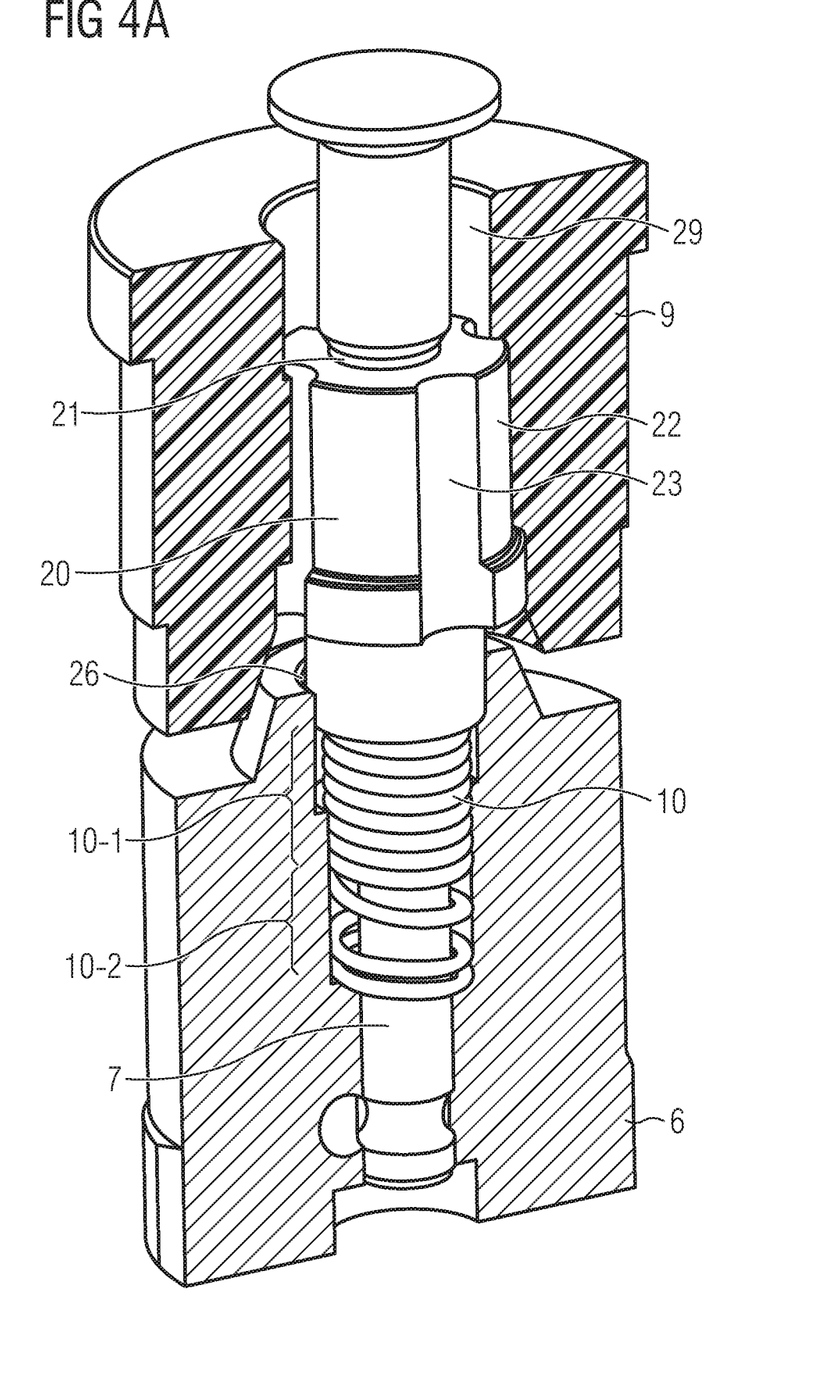
FIGS. 4A to 4C show schematic illustrations of portions of a switching device according to a further exemplary embodiment.
Figure 4B:
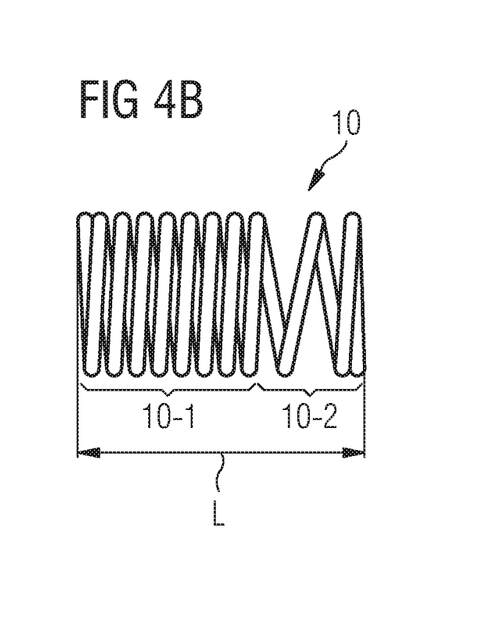
Figure 4C:
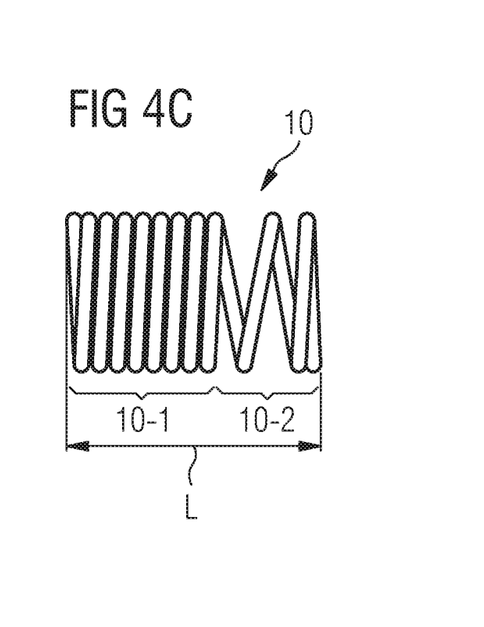

A further exemplary embodiment which forms a modification to the exemplary embodiment shown in FIG. 2 is shown in conjunction with FIGS. 4A to 4C. FIG. 4A shows a portion of the switching device, while FIGS. 4B and 4C show the spring in two different states during a switching process. Here, components and features of the switching device which are not shown and/or described in conjunction with the exemplary embodiment of FIGS. 4A to 4C can once again be designed as described in conjunction with the previous figures. For reasons of improved identification, the magnetic core 6 and the yoke 9 are illustrated in cut-open form in FIG. 4A. As is described in conjunction with FIG. 2, the spring 10 is designed as a non-linear spring with a first spring region 10-1 and a second spring region 10-2 with different spring constants.

In comparison to the previous exemplary embodiment in which the shaft 7 is guided directly through the yoke 9, the yoke 9 has an opening 29, in which a liner 20 is arranged, in the exemplary embodiment of FIGS. 4A to 4C. The liner 20 includes a low-friction, hydrogen-compatible plastic, in particular PE, glass-filled PBT and/or preferably PEEK. The liner 20 is particularly preferably formed from PEEK which, with a melting point of 335° C., is advantageously resistant to high temperatures in respect of the temperatures which usually occur in gas-filled contactors. The shape described below of the liner 20 can be produced by a manufacturing method such as injection molding for example.

In order to guide the shaft 7, the liner 20 has a guide opening 21 which is of, in particular, cylindrical design and in which the shaft 7 is arranged, so that the shaft 7 in the guide opening 21 projects through the liner 20. The guide opening 21 and the shaft 7 preferably have a very tight fit in order to allow precise guidance of the shaft 7. The guide opening 21 therefore has a diameter which is only very slightly larger than the diameter of the shaft 7. As can be clearly identified, the shaft 7 is guided free of contact with the yoke 9 in the liner 20. Owing to the non-existent contact between the shaft 7 and the yoke 9, abrasion between the shaft 7 and the yoke 9, which abrasion could occur on account of the materials used for the shaft 7 and the yoke 9 with an increasing number of switching processes, can therefore be prevented.

The liner 20 is fastened in the opening 29 of the yoke 9 by a press fit, wherein the liner 20 does not necessarily have to fill the entire opening 29 of the yoke 9, as shown. To this end, the liner 20 has an outer surface 22 which is at least partially in contact with the inner wall of the opening 29 of the yoke 9. Owing to the press fit, the liner 20 is fixed in the opening 29 of the yoke 9 independently of the movement of the shaft 7.

The liner 20 can, by way of the entire outer surface 22 and/or over the entire circumference, bear against the inner surface of the opening 29 of the yoke 9. However, it may be more advantageous when, as is shown in FIG. 4A, at least one channel 23 is formed in the outer surface 22. The at least one channel 23 can particularly preferably run parallel to the shaft 7. The at least one channel 23 preferably runs from a side that is facing away from the movable contact to a side of the liner 20 that faces the movable contact, and forms an intermediate space, which extends through the opening 29 of the yoke 9, between the inner wall of the opening 29 and the outer surface 22 of the liner 20, said intermediate space allowing gas exchange through the opening 29 of the yoke 9. When the magnetic armature moves during a switching process of the switching device, gas can therefore flow through a channel 23 of this kind and therefore follow the movement of the moving parts, so that no positive pressure or vacuum which could lead to a delay in the switching process can form in a subregion in the gas volume.

In the exemplary embodiment shown, the liner 20 has a plurality of channels 23 in the outer surface 22. Four channels 23 are shown purely by way of example, but there may also be more or fewer channels. The channels 23 are, as shown, preferably arranged at regular intervals on the outer surface 22 of the liner 20 around the guide opening 21 and therefore around the shaft 7 and all run parallel to the shaft 7. Between the channels 23, the outer surface 22 of the liner 20, which outer surface is in contact with the inner wall of the opening 29 of the yoke 9, as described above, ensures a press fit and therefore fixing of the liner 20 in the opening 29 of the yoke 9.

As is further shown in FIG. 4A, the liner 20 can project into the opening 26 in the magnetic core 6, in which opening the shaft 7 is fastened, in at least one switching state of the switching device and preferably permanently. In particular, the liner 20 can also form a stop for the spring 10, while the magnetic core 6 forms the other stop for the spring 10 as in the previous exemplary embodiment.

FIG. 4B shows the spring 10 in the first switching state, that is to say in the inoperative state of the switching device. Here, the total length L of the spring 10, in the relaxed state, is approximately 9 mm given a diameter of approximately 4 mm and, purely by way of example, 8.1 mm in the first switching state in the installed state. In the exemplary embodiment shown, the first spring region 10-1 has 8 windings and a spring travel of 1 mm. The second spring region 10-2 has two windings and a spring travel of several millimeters. FIG. 4C shows the spring 10 in the intermediate state which corresponds to FIG. 3B, in which intermediate state the first spring region 10-1 is completely compressed, so that the turns of the first spring region 10-1 are blocked. According to the present exemplary embodiment, the spring 10 has a length L of 70.1 mm in this state. In the event of further compression of the spring 10 in order to reach the second switching state, only the second spring region 10-2 with the greater spring constant is still compressed, as is described in conjunction with FIGS. 3A to 3C.

Figure 5A:
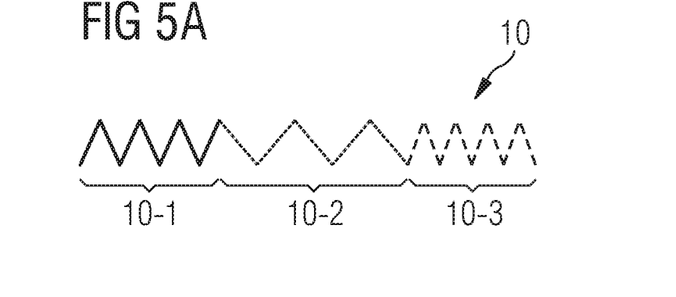
FIGS. 5A and 5B show schematic illustrations of springs of a switching device according to further exemplary embodiments.
Figure 5B:
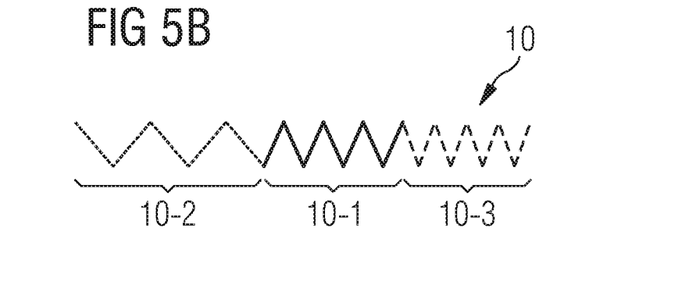

As an alternative to the exemplary embodiments shown having a spring 10 with two spring regions 10-1, 10-2, the spring 10 can also have more than two spring regions. For example, it may be possible for the spring 10, as is indicated in FIGS. 5A and 5B, to have at least one third spring region 10-3 with a third spring constant which is greater than the second spring constant of the second spring region 10-2. In respect of the design and the behavior of the third spring region 10-3 in relation to the second spring region 10-2, that which is described above for the first spring region 10-1 and the second spring region 10-2 can apply. The second spring region 10-2 can be arranged, for example, between the first spring region 10-1 and the third spring region 10-3, as is shown in FIG. 5A. Furthermore, it may also be possible for the first spring region 10-1 to be arranged between the second spring region 10-2 and the third spring region 10-3, as is shown in FIG. 5B. Furthermore, there may also be more than three spring regions with different spring constants.

The features and exemplary embodiments described in the in conjunction with the figures can be combined with one another according to further exemplary embodiments, even if not all combinations have been explicitly described. Furthermore, the exemplary embodiments described in conjunction with the figures may alternatively or additionally include further features in accordance with the description in the general part.

The invention is not restricted to the exemplary embodiments by the description on the basis of said exemplary embodiments. Rather, the invention encompasses any novel feature and any combination of features, which in particular includes any combination of features in the patent claims, even if this feature or this combination is not itself explicitly specified in the patent claims or exemplary embodiments.

The invention claimed is:

1. A switching device comprising:
   at least one stationary contact; and
   a movable contact movable from a first switching state to a second switching state by a magnetic armature,
   wherein the magnetic armature has a spring configured to reset the movable contact from the second switching state to the first switching state,
   wherein the spring has a first spring region with a first spring constant and a second spring region with a second spring constant which is greater than the first spring constant,
   wherein at least a part of the spring is arranged in an opening of a magnetic core of the magnetic armature, and
   wherein the switching device is configured to switch an electrical load.

2. The switching device according to claim 1, wherein the first spring region is configured to be compressed when a changeover is made from the first switching state to an intermediate state.

3. The switching device according to claim 2, wherein the first spring region is configured to be blocked during a changeover from the intermediate state to the second switching state.

4. The switching device according to claim 1, wherein only the first spring region is configured to be compressed when a changeover is made from the first switching state to an intermediate state.

5. The switching device according to claim 1, wherein the second spring region is configured to be compressed when a changeover is made from an intermediate state to the second switching state.

6. The switching device according to claim 1, wherein only the second spring region is configured to be compressed when a changeover is made from an intermediate state to the second switching state.

7. The switching device according to claim 1, wherein the first spring region and the second spring region have windings of different degrees of closeness.

8. The switching device according to claim 1, wherein the first spring region and the second spring region have different numbers of windings.

9. The switching device according to claim 1, wherein the first spring region and the second spring region have different spring travels.

10. The switching device according to claim 1, wherein the spring has at least one third spring region with a third spring constant which is greater than the second spring constant.

11. The switching device according to claim 1, wherein the magnetic armature has a shaft and the shaft projects through the spring.

12. The switching device according to claim 11, wherein the shaft projects through an opening in a yoke, which is part of a magnetic circuit, and a liner composed of a plastic is arranged in the opening of the yoke for guiding the shaft.

13. The switching device according to claim 12, wherein the liner forms a stop for the spring.

14. The switching device according to claim 1, wherein the contacts are arranged in a switching chamber configured to contain a gas which contains $H_2$.

15. The switching device according to claim 14, wherein the gas has an $H_2$ content of at least 50%.

16. A switching device comprising:
   at least one stationary contact; and
   a movable contact movable from a first switching state to a second switching state by a magnetic armature,
   wherein the magnetic armature has a spring configured to reset the movable contact from the second switching state to the first switching state,
   wherein the spring has a first spring region with a first spring constant and a second spring region with a second spring constant which is greater than the first spring constant,
   wherein the first spring region is configured to be blocked during a changeover from an intermediate state to the second switching state, and
   wherein the switching device is configured to switch an electrical load.

17. A switching device comprising:
   a magnetic armature being configured to move a movable contact from a first switching state to a second switching state and having a spring to reset the movable contact from the second switching state to the first switching state,
   wherein the spring has a first spring region with a first spring constant and a second spring region with a second spring constant being different from the first spring constant,
   wherein the first spring region is configured to be blocked during a changeover from an intermediate state to the second switching state, and wherein the switching device is configured to switch an electrical load.

\* \* \* \* \*